Jan. 20, 1953 M. C. HARROLD 2,626,330
ELECTRICAL APPARATUS
Filed May 5, 1948 8 Sheets-Sheet 1

FIG. 1

INVENTOR.
Marshall C Harrold
BY
Spencer Hardman and Fehr
attorneys

Jan. 20, 1953  M. C. HARROLD  2,626,330
ELECTRICAL APPARATUS
Filed May 5, 1948  8 Sheets-Sheet 5

FIG. 5

Jan. 20, 1953 M. C. HARROLD 2,626,330
ELECTRICAL APPARATUS

Filed May 5, 1948 8 Sheets-Sheet 6

INVENTOR.
Marshall C Harrold
BY
Spencer Hardman and Fehr
attorneys

Jan. 20, 1953 M. C. HARROLD 2,626,330
ELECTRICAL APPARATUS
Filed May 5, 1948 8 Sheets-Sheet 7

INVENTOR.
Marshall C Harrold
BY
Spencer Hardman and Fehr
Attorneys

Jan. 20, 1953 M. C. HARROLD 2,626,330
ELECTRICAL APPARATUS

Filed May 5, 1948 8 Sheets-Sheet 8

INVENTOR.
Marshall C. Harrold
BY
Spencer Hardman and Fehr
Attorneys

Patented Jan. 20, 1953

2,626,330

UNITED STATES PATENT OFFICE 2,626,330

ELECTRICAL APPARATUS

Marshall C. Harrold, Dayton, Ohio, assignor to General Motors Corporation, Dayton, Ohio, a corporation of Delaware Application May 5, 1948, Serial No. 25,157

9 Claims. (Cl. 200—116)

This invention relates to electrical apparatus and more particularly to circuit overload protectors.

Circuit overload protectors of many varieties have been made for many years. They have not been fool-proof. In the case of some protectors, it is possible to force operation of the electrical apparatus under conditions which are dangerous to the apparatus. Some protectors may be opened manually by misuse of the reset apparatus.

It is an object of my invention to provide a means for protecting an electric circuit and electrical devices in such as a circuit from excess current flow which cannot by any possible type of manipulation short of actual destruction be prevented from properly carrying out its protective function and which cannot be damaged by misuse when properly installed.

It is another object of my invention to provide a manually reset electrical circuit protector in which the contacts cannot be opened at any time except under the conditions for which it is designed to function to protect the circuit, and which will trip open without fail under the conditions for which it is designed to function regardless of any possible misuse of the manual reset device.

These objects are attained by providing a contact breaker which is rockably mounted on a slide member normally held by an electro-thermally responsive ratchet wheel in a position in which the single spring acting upon the contact breaker holds the contacts closed. Upon release of the ratchet wheel the spring moves the contact breaker into engagement with a stop means. The reaction from this engagement pivots and contact breaker to open circuit position. The contact breaker has a resetting arm which is aligned with the manual reset button after the slide member and the contact breaker are fully released. The engagement of the manual reset button with the resetting arm holds the contact breaker in the open position throughout the resetting. Closing of the circuit cannot take place until the ratchet wheel is engaged and also the push button released.

Further objects and advantages will be apparent from the following description, reference being had to the accompanying drawings, wherein a preferred form of the present invention is clearly shown.

Referring now to the drawings, there is shown a case 20 preferably made of a suitable plastic electrical insulating material. This case 20 is provided with slideways 22 in the opposite side walls thereof. There are mounted side by side in these slideways 22 a flanged push button slide member 24 and a flanged pawl slide member 26. Rockably mounted upon the pawl slide member 26 is a contact breaker member 28.

Figures 8, 9, 10, 11:
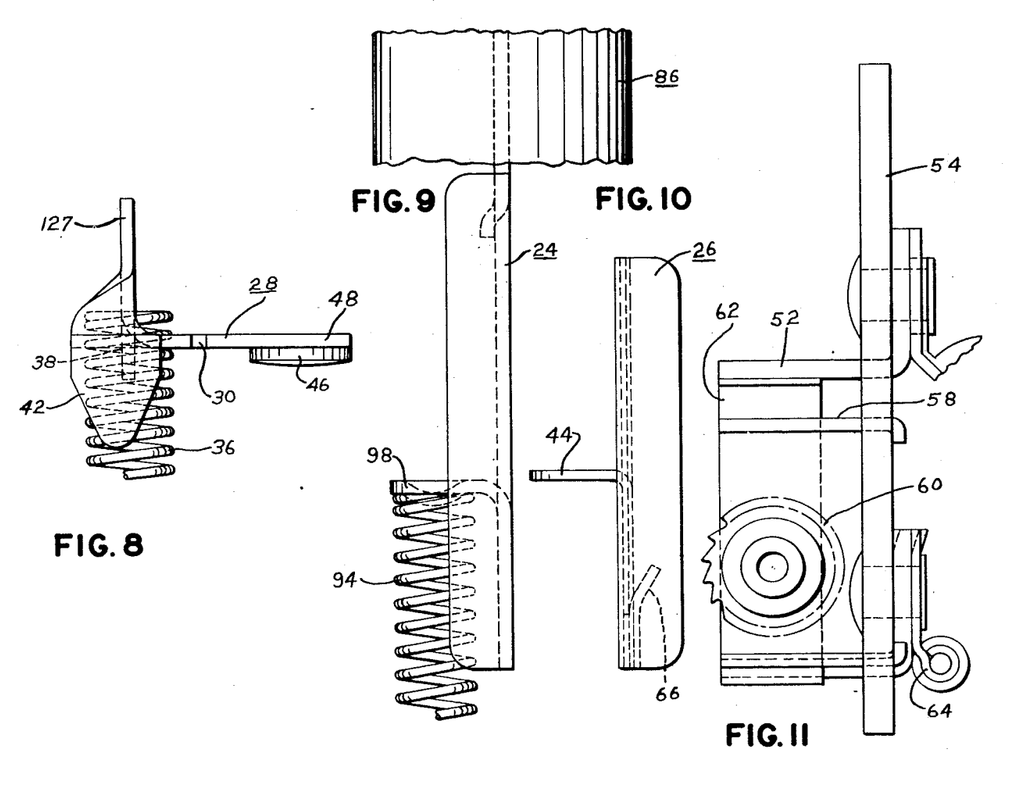
Fig. 8 is a side view of the contact breaker member and its spring.
Fig. 9 is a side view of the push button slide member and its spring.
Fig. 10 is a side view of the pawl slide member and its spring.
Fig. 11 is a side view of the ratchet wheel and its mounting.

As is better shown in Fig. 8 this contact breaker member 28 is provided with a pair of notches 30 which slip over parallel edge portions 32 in the web of the pawl slide member 26. These notches are wide enough to allow the contact breaker member 28 to rock through an amplitude of about 30 degrees or more upon a fulcrum formed by a thin rounded projection 34 in the web of the pawl slide member 26. The contact breaker member 28 is normally held against this edge 34 by a compression type coil spring 36 whose upper end is mounted on a downwardly projecting tongue 38 located upon one side of the notches 30. The lower end of the coil spring 36 is fitted over a peg 40 projecting upwardly from a shoulder provided on the side wall of the case 20.

Figure 1:
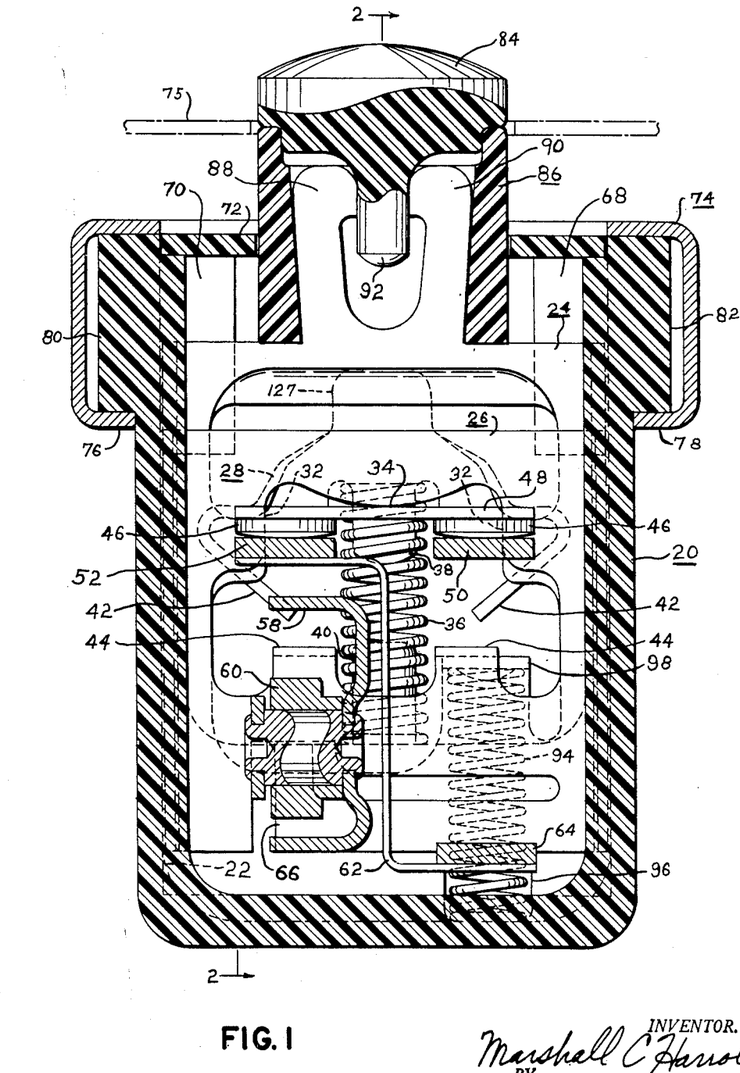
Fig. 1 is a vertical sectional view of a protector in closed position embodying one form of my invention, taken along the line 1—1 of Fig. 2.
Figure 2:
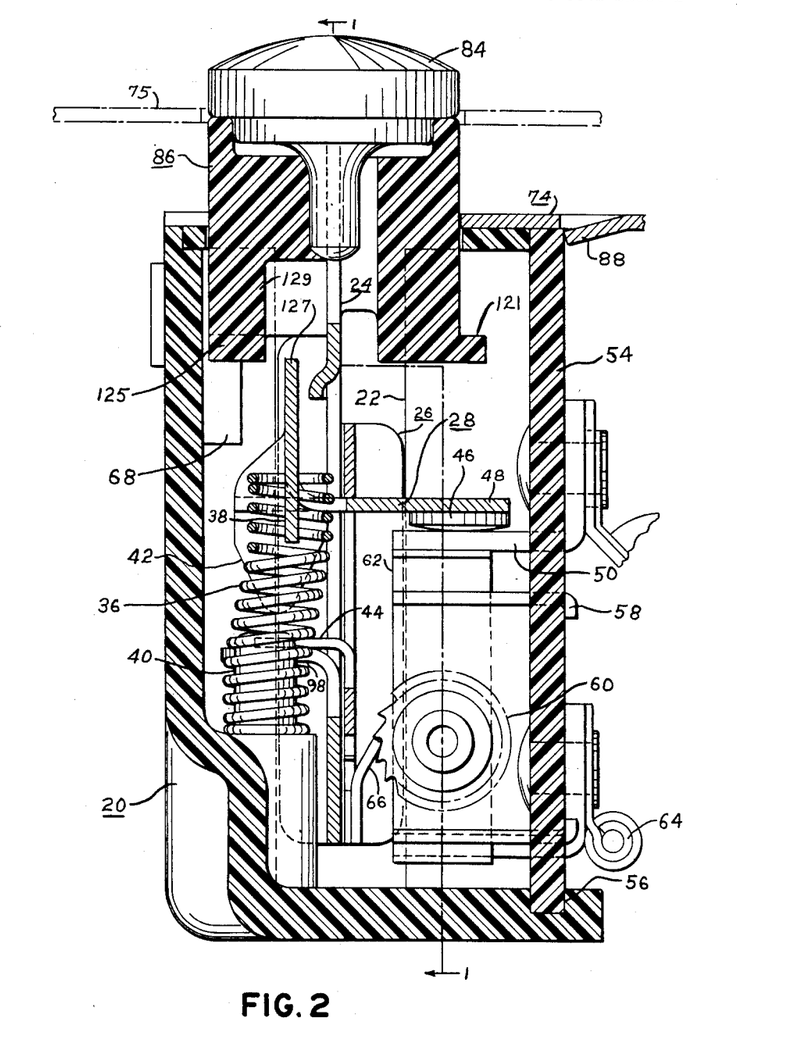
Fig. 2 is a sectional view taken along the line 2—2 of Fig. 1.

To prevent the contact breaker member 28 from becoming disengaged from the parallel edge portions upon resetting and to prevent it from rolling upon the curve of the fulcrum edge 34, the contact breaker member 28 is provided with a pair of downwardly turned ears 42 located on opposite sides of the downwardly extending tongue 38. These ears are aligned and located directly above the platform projections 44 formed from the web of the pawl 26. This arrangement of the notches 30 in engagement with the parallel edges 32 and contact of the member 28 with the edge 34, together with the downwardly turned ears 42 which, during resetting, rests upon the platform projections 44 all work together to provide a peculiar form of rockable mounting or pivot between the contact breaker member 28 and the pawl slide member 26. Since the pawl slide member 26 is slidably mounted in the slideways 22, the contact breaker member is mounted to rock upon a movable pivot or movable mounting which is guided in a path which is determined by the slideways 22 which guides a movement of the pawl slide 26. The coil spring 36 tends to rock the contact breaker member 28 in a clockwise direction as viewed in Figs. 8 and 2 so that the two contact buttons 46 which are riveted to the contact arm portion 48 are yieldingly held in contact with the stationary contact members 50 and 52 as shown in Figs. 8, 2 and 1.

These stationary contacts 50 are mounted upon a removable back plate 54 preferably of some suitable plastic electrical insulating material. The lower end of this back plate is mounted in a groove 56 provided in the bottom wall of the case 20. The back plate 54 is provided with a U-shaped bracket 58 to which a stud is riveted carrying the ratchet wheel 60 which is normally fixed thereon by a low melting solder. When the solder melts, the ratchet wheel 60 is free to rotate. At the side of the U-shaped bracket 58 is a ribbon heater 62 which extends from the bottom of the stationary contact 52 to the lower contact terminal 64. The current flows from the lower contact terminal 64 through the ribbon heater 62 to the upper stationary contact 52, thence through the contact breaker member 28 to the other stationary contact 50 to which is directly connected the other terminal. Under normal current flow the heat transmitted from the ribbon 62 to the ratchet wheel 60 is insufficient to cause the melting of the solder which holds the ratchet wheel 60 in place. Upon a current overload, however, the heat received by the ratchet wheel 60 from the ribbon heater 62 is sufficient to melt the solder and free the ratchet wheel 60 for rotation.

Under normal circumstances the ratchet wheel 60 is engaged by a pawl 66 at the end of a long tongue formed from the web portion of the pawl slide 26. In this way, the ratchet wheel 60 normally holds the pawl slide member 26 in the position shown in Fig. 2 so that the spring 36 pivots the contact breaker member 28 in the clockwise direction to the closed circuit position. Upon sufficient heating of the ratchet wheel 60 to free it for rotation thereby releasing the pawl 66, the spring 36 will lift the pawl slide 26 to the position shown in Fig. 3. The platform projections 44 upon the pawl slide 26 engage the downwardly turned ears 42 of the contact breaker member 28 to lift the contact breaker member 28 with the pawl slide 26 and carry it into engagement with two stop blocks 68 and 70 located in notches in adjacent corners of the casing 20.

Figure 3:
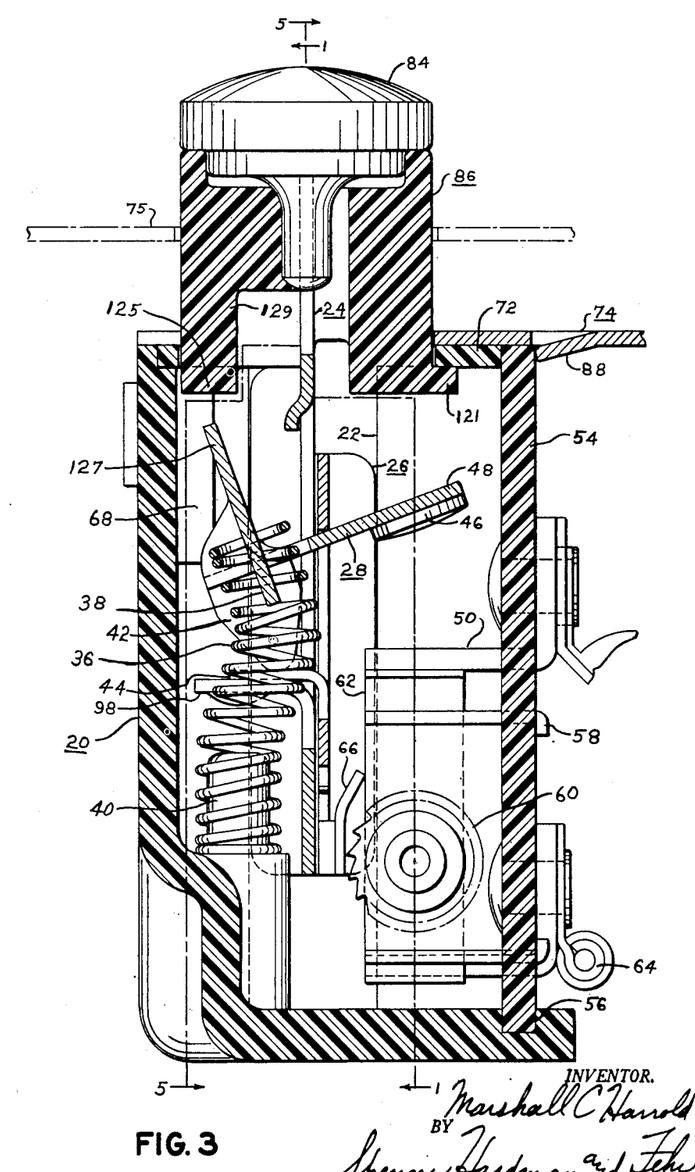
Fig. 3 is a sectional view similar to Fig. 2, but with the protector tripped open by a current overload.

The spring 36 acting upon the contact breaker member 28 now pivots the contact breaker member 28 in a counterclockwise direction as shown in Fig. 3 about the fulcrum formed by the stop blocks 68 and 70 to widely separate the contact buttons 46 from the stationary contact members 50 and 52 to open the circuit. The stop blocks 68 and 70 are held in place by a top member 72 of an electrical insulating plastic. This top member 72 is held in place by the mounting bracket 74 provided with depending inwardly turned flanges 76 and 78 which engage the flanges 80 and 82 formed on the opposite sides of the case 20. The mounting bracket normally is fastened to a structural support behind an ornamental escutcheon plate 75 indicated in dot and dash lines.

For resetting the protector after the occurrence of an overload there is provided a push button having an exposed end portion 84 preferably of a white plastic material and a cylindrical portion 86 behind the end portion, preferably of a red colored electrical insulating plastic which, by its exposure, will indicate the tripping of the overload protector. The top insulating member 72 has an aperture receiving the push button including the parts 84 and 86 and the mounting bracket 74 has a cutout portion permitting it to be slipped over the flanges 80 and 82 after the assembly of the protector is completed.

A tongue 88 engages the back plate 54 of the case to hold it in place.

The push button mounted upon the push button slide member 24 in a novel manner. As shown in Fig. 1, the red cylindrical portion 86 of the push button has a flared aperture therein which receives two prongs 88 and 90 which have inwardly turned hook-shaped end portions. When the push button slide member 24 is formed, the outer edges of these prongs are parallel to each other and to the flanged edges of the push button slide member 24. The red cylindrical portion 86 can then be slipped from the prongs 88 and 86. The end portion 84 of the push button has an inner projection which when the outer end is pushed inwardly, spreads the prongs 88 and 90 into contact with the flared walls of the cylindrical portion 86 to hold the cylindrical portion 86 firmly upon the push button slide member 24. The prongs 88 and 90 have a limited tendency to return to their original position through the inherent spring of the metal and this causes the hooked ends to engage the projection 92 and hold the outer end portion 84 in place. These prongs dig into the softer plastic of the projection 92 so that any efforts to dislodge the outer end will cause a deeper digging of the prongs into the projection to prevent it from coming loose. The push button slide is pushed upwardly by a separate coil spring 94 having its lower end seated in a well 96 in the bottom of the case 20 and its upper end pressing against a horizontal ear 98 struck out from the web of the push button slide 24. When the push button slide 24 is free to move, the spring 94 will push the slide member 24 until the horizontal ear engages the bottom of one of the platform projections of the pawl slide member. A flange 121 is also provided upon the red cylindrical portion 86 of the push button to engage the top insulating piece 72 to limit its outer movement. In this position, the red cylindrical button portion 86 is exposed to indicate that the protector has tripped open.

Figure 4:
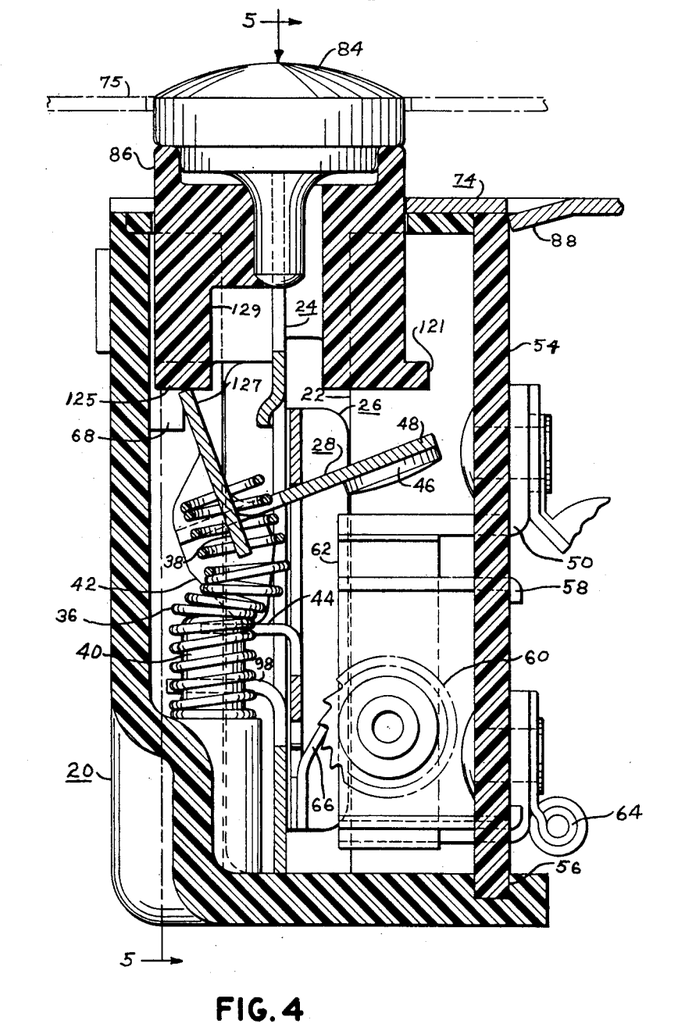
Fig. 4 is a sectional view similar to Figs. 2 and 3 but with the protector in the final stage of the resetting operation.
Figure 5:
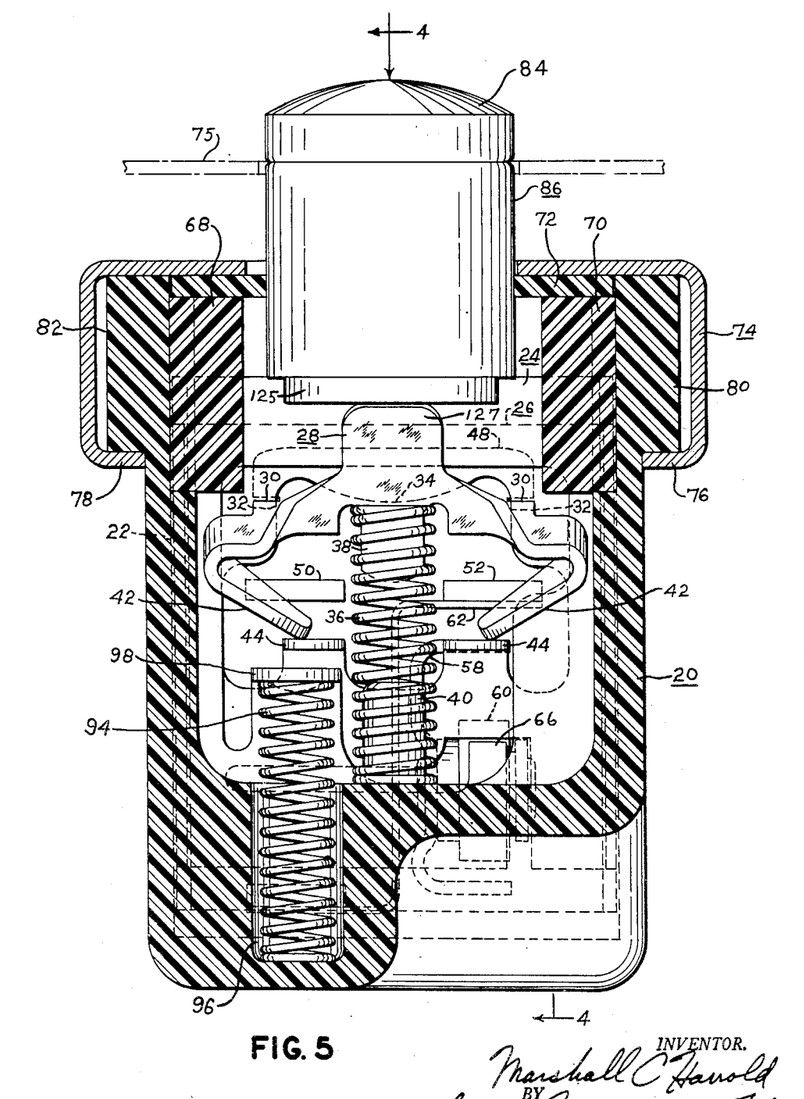
Fig. 5 is a sectional view taken along the line 5—5 of Fig. 4.
Figure 6:
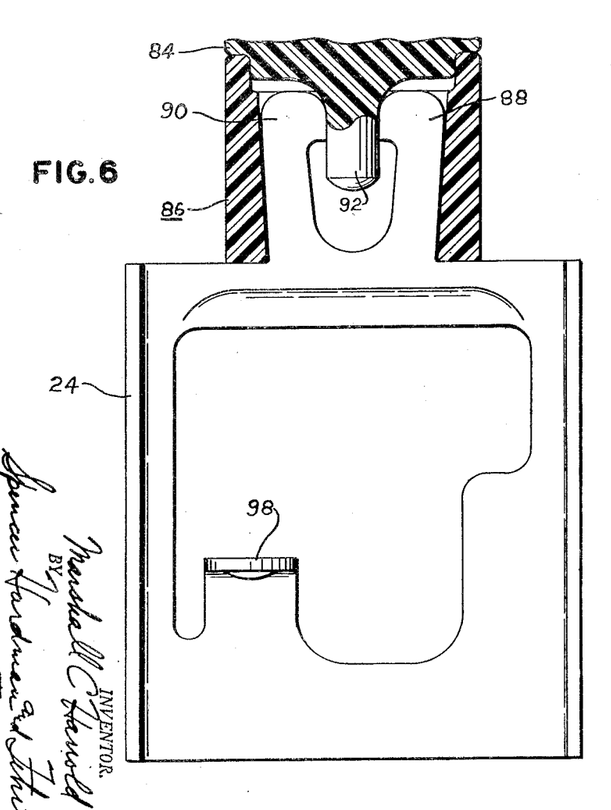
Fig. 6 is a view of the push button and the slide member upon which it is mounted.
Figure 7:
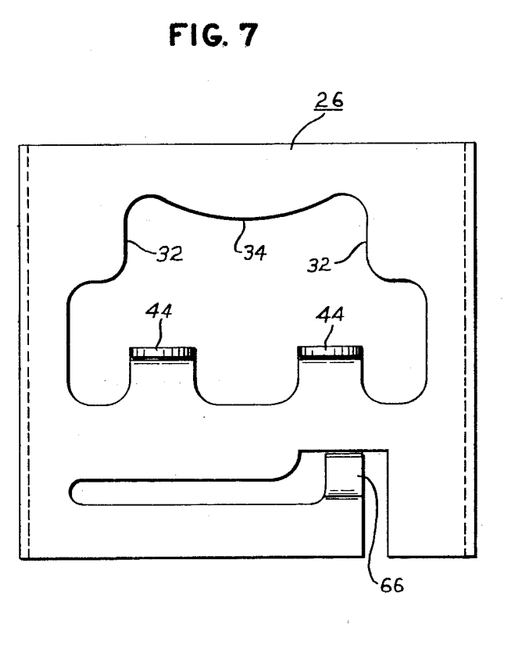
Fig. 7 is a view in elevation of the pawl slide member.

For resetting, the exposed end 84 of the push button is pushed inwardly. As it is pushed inwardly a projection 125 upon the inner portion of the red cylindrical portion 86 of the push button engages a perpendicular projection 127 upon the contact breaker member 28. This projection 127 only aligns itself with the projection 125 when the contact breaker member 28 has tripped to the open circuit position as shown in Figs. 3 and 4. When the projection 125 engages the projection 127 upon the contact breaker member 28 the contact breaker member 28 is held in its counterclockwise position as long as force is applied in the resetting direction. This is insured by the formation of a counterclockwise force couple consisting of the projection 125 and the spring 36. The contact buttons 46 cannot be reset until the push button projection 125 is pushed downwardly far enough for the pawl 66 to engage a tooth upon the ratchet wheel 60 and to be held thereby. If the ratchet wheel is free to rotate, it cannot hold the pawl 66 and the contact buttons 46, and the contact breaker member 28 cannot be used in closed circuit position since the contact breaker member 28 is always held in the open circuit position by the counterclockwise force couple as long as the pawl slide 26 is free to move upwardly away from its normal engaged position.

However, upon the engagement and the holding of the pawl 66 by the ratchet wheel 60 and the release of the push button 84 so that the projection 125 disengages itself from the projection 127, the circuit breaker member 28 will move in a clockwise direction to closed position, as shown in Fig. 2, with the contact button in engagement with the stationary contact members 50 and 52 under the force of the spring 36 about the fulcrum formed by the thin edge 34 and the notches 38. The pivoting of the circuit breaker member 28 to the closed circuit position aligns the projection 127 with a recess 129 in the red cylindrical portion 86 push button as shown in Fig. 2, so that any attempt to push inwardly upon the outer end 84 of the push button will not cause the push button to engage the projection 127 or any other movable part. The push button slide 124 will merely be pushed downwardly until its lower end engages the bottom of the case 20. Therefore the push button cannot be manipulated in any way to open the contacts.

Figures 12, 13:
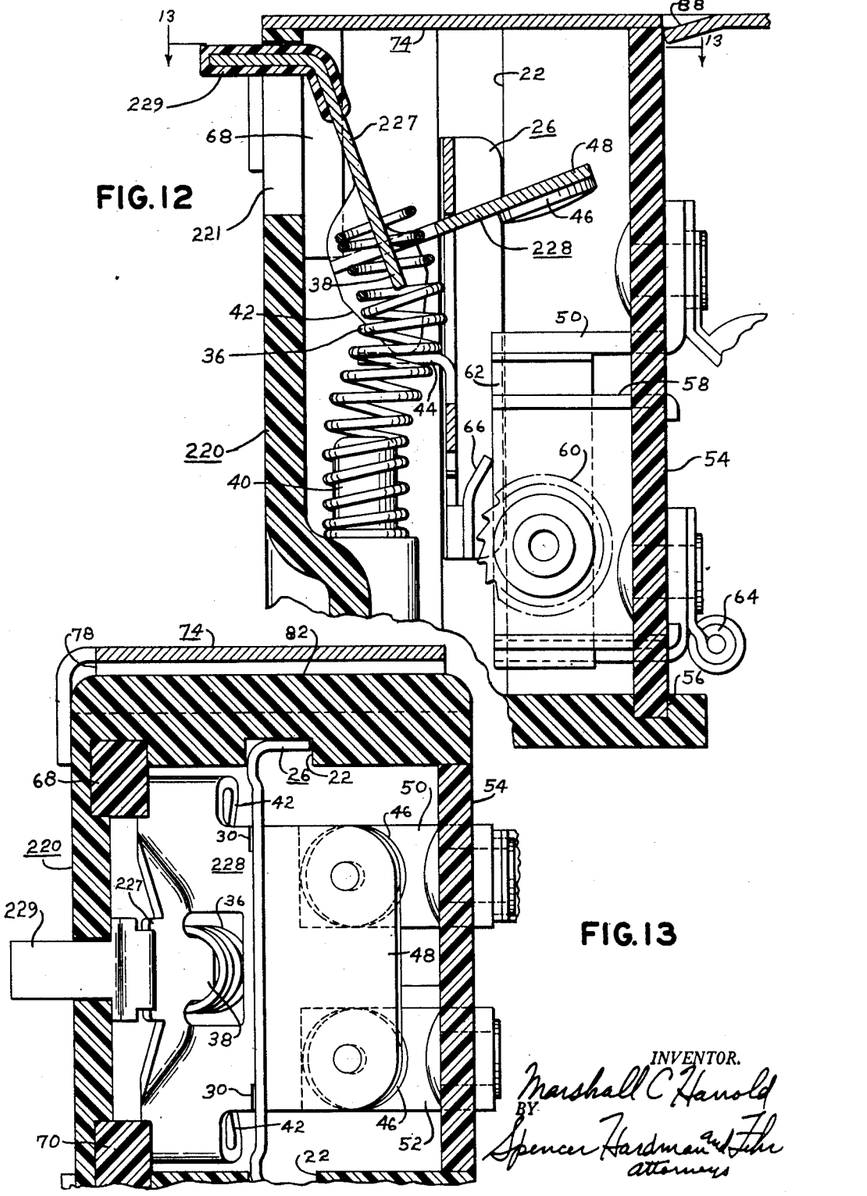
Fig. 12 is a vertical sectional view of a modified form of the invention.
Fig. 13 is a sectional view taken along the line 13—13 of Fig. 12.

In Figs. 12 and 13 there is shown a modified form of the invention in which the back plate, the ratchet wheel, the ribbon heater, the stationary contacts and the pawl slide are the same as in the first modification and bear the same reference characters. However, instead of having a separate push button slide, the projection 227, which is similar to the projection 127 in Fig. 3, is extended to perform the function of the push button slide 24, so that when the ratchet wheel releases the pawl slide member 26, the bent end portion of the projection 227 extends through the slot 221 in the wall of the casing. The bent portion of the projection 227 is enclosed by a plastic electrical insulating material 229, which serves as an operating projection to push contact breaker member 228 and the pawl slide member 26 downwardly until the pawl 66 engages the ratchet wheel 60. The pushing upon the projection 229 imposes a counterclockwise force couple upon the contact breaker member 228 to hold it open throughout the resetting operation. Upon engagement of the pawl 66 with the ratchet wheel 60 and the release of the projection 229 the spring 36 will pivot the contact breaker member 228 in the clockwise direction to closed position as before, and the projection 229 will no longer be exposed outside of the case 220 thereby avoiding its manipulation after closing. This illustrates that the push button slide can be omitted in this way.

It will be found that this protector is rugged and low in cost and provides reliable and positive protection of the circuit and its own mechanism.

While the form of embodiment of the invention as herein disclosed, constitutes a preferred form, it is to be understood that other forms might be adopted, as may come within the scope of the claims which follow.

What is claimed is as follows:

1. An electric circuit protector including a guide means, a contact breaker means having a support arrangement guided in a predetermined path by said guide means, a stationary contact means constituting with the breaker means a switch mechanism, a spring means for moving said contact breaker means with its support guided in a predetermined path by said guide means, an electrical current responsive holding means for restraining said support from movement under safe current conditions and for releasing said support for movement under the guidance of said guide means under the force of said spring means, stop means located in the path of movement of a portion of the contact breaker means eccentric to said support and offset from said predetermined path for causing a pivotal movement from closed to open circuit position of the contact breaker means about the stop means upon engagement therebetween, said contact breaker means being provided with manual reset means.

2. An electric circuit protector including a slide means, a contact breaker means rockably mounted upon said slide means, a cooperating contact means cooperating with the portion of said contact breaker means on one side of the rockable mounting to control the flow of electric energy, current responsive holding means for holding said slide means in one position during safe current flow conditions and releasing said slide means under unsafe current flow conditions, a stop means for engaging the portion of the contact breaker means on the opposite side of the rockable mounting, spring means acting upon that portion of the contact breaker means between the rockable mounting and said stop, said spring means acting in a direction parallel to the movement of the slide means, said contact breaker means being provided with a resetting arm.

3. An electric circuit protector including a slide means, a contact breaker means rockably mounted upon said slide means, a cooperating contact means cooperating with the portion of said contact breaker means on one side of the rockable mounting to control the flow of electric energy, current responsive holding means for holding said slide means in one position during safe current flow conditions and releasing said slide means under unsafe current flow conditions, a stop means for engaging the portion of the contact breaker means on the opposite side of the rockable mounting, spring means acting upon that portion of the contact breaker means between the rockable mounting and said stop, said spring means acting in a direction parallel to the movement of the slide means, said contact breaker means being provided with a resetting arm movable to an ineffective position upon movement of the contact breaker means to closed circuit position and movable to resetting position when the contact breaker means is moved to the open circuit position, and a movable manipulating means having means misaligned with said resetting arm when said arm is in its ineffective position to prevent engagement of said resetting arm when said arm is in its ineffective position but aligned to engage said arm when said arm is in its effective position.

4. An electric circuit protector including a slidable manipulating means, a slidable latch means slidably mounted in a path parallel to the path of movement of the manipulating means, a contact breaker means rockably mounted upon said latch means, said breaker means having a contact arm constituting one element of a switch contact mechanism, a stationary contact means constituting the second element of the switch contact mechanism, said stationary contact means cooperating with said contact arm to control the flow of electric energy, spring means for urging said latch means in a direction to separate the contact arm and the stationary means and for urging said breaker means to rock in a direction to move the contact arm in engagement with the stationary contact means, a releasable restraining means normally in engagement with the latch means for normally preventing the movement of the latch means by the spring means, a stationary means located in the path of movement of said contact breaker means for pivoting the contact breaker means to open position upon release of said restraining means, said manipulating means being provided with a projection for engaging said contact breaker means to move said latch means into engagement with the restraining means.

5. An electric circuit protector including a slidable manipulating means, a slidable latch means slidably mounted in a path parallel to the path of movement of the manipulating means, a contact breaker means rockably mounted upon said latch means, said breaker means having a contact arm constituting one element of a switch contact mechanism, a stationary contact means constituting the second element of the switch contact mechanism, said stationary contact means cooperating with said contact arm to control the flow of electric energy, spring means for urging said latch means in a direction to separate the contact arm and the stationary means and for urging said breaker means to rock in a direction to move the contact arm in engagement with the stationary contact means, a releasable restraining means normally in engagement with the latch means for normally preventing the movement of the latch means by the spring means, a stationary means located in the path of movement of said contact breaker means for pivoting the contact breaker means to open position upon release of said restraining means, said manipulating means being provided with a projection, said contact breaker means being provided with a projection offset from said rockable mounting movable to a position in alignment with the projection upon the manipulating means when the contact arm is in the open circuit position so that the manipulating means is effective to move the latch means into engagement with the restraining means.

6. An electric circuit protector including a movable manipulating means, a movable latch means, a contact breaker means constituting one element of a switch contact mechanism rockably mounted upon the latch means, a second contact means constituting the second element of a switch contact mechanism contacted directly by said contact breaker means to control the flow of electric energy, yielding means acting upon the contact breaker means for urging said breaker means into contact with said second contact means and for urging said latch means to move, an electrical current responsive restraining means for normally preventing the movement of said latch means, a stop means located in the path of movement of one portion of the contact breaker means to provide a pivoting point for moving the contact breaker means to open circuit position under the force of said yielding means when the latch means is released by the restraining means, said contact breaker means having a resetting arm movable to a first position when the contact breaker means is in the open circuit position and movable to a second position when the contact breaker means is in the closed circuit position, said manipulating means being provided with a projection located in alignment with said first position and a recess at the side of said projection in alignment with said second position for receiving said arm when in said second position so that said arm can be engaged by said projection only when said breaker means is in the open circuit position.

7. An electric circuit protector including a movable latch means, a contact breaker means rockably mounted upon the latch means, said contact breaker means constituting one element of a switch contact mechanism, a second contact means constituting the second element of a switch contact mechanism contacted directly by said contact breaker means to control the flow of electric energy, yielding means acting upon the contact breaker means for urging said breaker means into contact with said second contact means and for urging said latch means to move, an electrical current responsive restraining means for normally preventing the movement of the latch means, a stop means located in the path of movement of one portion of the contact breaker means to provide a pivoting point for moving the contact breaker means to open circuit position under the force of said yielding means when the latch means is released by the restraining means, said contact breaker means having as a fixed part thereof a resetting arm movable to an effective position where it is accessible to resetting manipulation when the contact breaker means is in the open circuit position and movable to an ineffective position where it is inaccessible to resetting manipulation when the contact breaker means is in the closed circuit position.

8. An electric circuit protector including a guide means, a contact breaker means having a support arrangement guided in a predetermined path by said guide means, a stationary contact means constituting with the breaker means a switch mechanism, a spring means for moving said contact breaker means with its support guided in a predetermined path by said guide means, an electrical current responsive holding means for restraining said support from movement under safe current conditions and for releasing said support for movement under the guidance of said guide means under the force of said spring means, said contact breaker means being provided with a reset extension movable with the contact breaker means, stop means located in the path of movement of a portion of the contact breaker means eccentric to said support and offset from said predetermined path for causing a pivotal movement from closed to open circuit position of the contact breaker means about the stop means upon engagement of said contact breaker means with the stop means, and means for protecting said reset extension from reset manipulation when said contact breaker means is in closed position and for exposing said reset extension to reset manipulation when said contact breaker means is in the open position.

9. An electric circuit protector including a guide means, a contact breaker means having a support arrangement guided in a predetermined path by said guide means, a stationary contact means constituting with the breaker means a switch mechanism, a spring means for moving said contact breaker means with its support guided in a predetermined path by said guide means, an electrical current responsive holding means for restraining said support from movement under safe current conditions and for releasing said support for movement under the guidance of said guide means under the force of said spring means, said contact breaker means being provided with a reset extension movable with the contact breaker means, stop means located in the path of movement of a portion of the contact breaker means eccentric to said support and offset from said predetermined path for causing a pivotal movement from closed to open circuit position of the contact breaker means and corresponding movement of said reset extension from non-reset to resetting position about the stop means upon engagement of said contact breaker means with the stop means, and protecting means for protecting said reset extension when in non-reset position from reset manipulation, said reset position of said reset extension being outside the area of said protecting means.

MARSHALL C. HARROLD.

REFERENCES CITED

The following references are of record in the file of this patent:

UNITED STATES PATENTS

| Number | Name | Date |
| --- | --- | --- |
| 2,276,085 | Pearson | Mar. 10, 1942 |
| 2,359,605 | Ballou | Oct. 3, 1944 |
| 2,425,623 | Kuhn et al. | Aug. 12, 1947 |
| 2,426,387 | Caswell | Aug. 26, 1947 |